(12) United States Patent
Singla (10) Patent No.: US 9,355,148 B2
(45) Date of Patent: May 31, 2016

(54) SYSTEMS AND METHODS FOR IN-MEMORY PROCESSING OF EVENTS

(75) Inventor: Anurag Singla, Cupertino, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 303 days.

(21) Appl. No.: 14/110,333

(22) PCT Filed: Apr. 29, 2011

(86) PCT No.: PCT/US2011/034674
§ 371 (c)(1),
(2), (4) Date: Oct. 7, 2013

(87) PCT Pub. No.: WO2012/148427
PCT Pub. Date: Nov. 1, 2012

(65) Prior Publication Data
US 2014/0032535 A1    Jan. 30, 2014

(51) Int. Cl.
*G06F 17/30* (2006.01)
*G06F 21/55* (2013.01)
*H04L 29/06* (2006.01)

(52) U.S. Cl.
CPC .... *G06F 17/30477* (2013.01); *G06F 17/30345* (2013.01); *G06F 17/30516* (2013.01); *G06F 21/552* (2013.01); *H04L 63/1408* (2013.01)

(58) Field of Classification Search
None
See application file for complete search history.

(56) References Cited

U.S. PATENT DOCUMENTS

| | | | |
|---|---|---|---|
| 6,314,533 B1 | 11/2001 | Novik et al. | |
| 7,631,074 B1 | 12/2009 | Srivastava et al. | |
| 7,844,620 B2 | 11/2010 | Barsness et al. | |
| 7,865,487 B2 | 1/2011 | Gan et al. | |
| 7,882,262 B2 | 2/2011 | Bhattacharya et al. | |
| 2003/0009443 A1 | 1/2003 | Yatviskiy | |
| 2005/0177579 A1* | 8/2005 | Blakeley | G06F 17/30412 |
| 2005/0262059 A1 | 11/2005 | White | |
| 2006/0098594 A1* | 5/2006 | Ganesh | G01D 21/00 370/328 |
| 2007/0043703 A1 | 2/2007 | Bhattacharya et al. | |
| 2008/0065590 A1 | 3/2008 | Castro et al. | |
| 2008/0077588 A1 | 3/2008 | Zhang et al. | |
| 2008/0162592 A1* | 7/2008 | Huang | G06F 11/3476 |
| 2008/0301135 A1 | 12/2008 | Alves et al. | |
| 2011/0016123 A1 | 1/2011 | Pandey et al. | |
| 2011/0040744 A1 | 2/2011 | Haas et al. | |

OTHER PUBLICATIONS

International Searching Authority, Appl No. PCT/US2011/034674 filed Apr. 29, 2011, International Search Report and Written Opinion dated Feb. 8, 2012;8 pages.
Extended European Search Report received in EP Application No. 11864430.1, Feb. 25, 2015, 5 pages.

* cited by examiner

*Primary Examiner* — Albert Phillips, III
(74) *Attorney, Agent, or Firm* — Hewlett Packard Enterprise Patent Department (57) ABSTRACT

Systems and methods for in-memory processing of events are provided. A set of unique elements of a plurality of queries is determined. Each query is executed on a defined schedule and time duration. A plurality of events in an event stream are received. The events are filtered using the set of unique elements. For each query, a query result for each filtered event is determined. For each query, in-memory aggregation of the query result of each filtered event is provided.

15 Claims, 7 Drawing Sheets

SYSTEMS AND METHODS FOR IN-MEMORY PROCESSING OF EVENTS

I. BACKGROUND

The field of security information/event management (SIM or SEM) is generally concerned with 1) collecting data from networks and networked devices that reflects network activity and/or operation of the devices and 2) analyzing the data to enhance security. For example, the data can be analyzed to identify an attack on the network or a networked device and determine which user or machine is responsible. If the attack is ongoing, a countermeasure can be performed to thwart the attack or mitigate the damage caused by the attack. The data that is collected usually originates in a message (such as an event, alert, or alarm) or an entry in a log file, which is generated by a networked device. Networked devices include firewalls, intrusion detection systems, and servers.

Each message or log file entry ("event") is stored for future use. Security systems may also generate events, such as correlation events and audit events. Together with messages and log file entries, these and other events are also stored on disk. In an average customer deployment, one thousand events per second may be generated. This amounts to 100 million events per day or three billion events per month The analysis and processing of such a vast amount of data can incur significant load on the security system, causing delays in reporting results.

II. BRIEF DESCRIPTION OF THE DRAWINGS

The present disclosure may be better understood and its numerous features and advantages made apparent by referencing the accompanying drawings.

III. DETAILED DESCRIPTION

Security systems may offer reports to the end user that can be used to track various data points, such as the count of login attempts, top users with successful and failed login attempts, top inbound or outbound blocked sources and destinations, and configuration changes to networked devices. Generally, a report provides summary information on these and other events involving networked devices in a customer environment that is under the purview of the security system. Unless otherwise indicated, a networked device includes both network-attached devices (e.g., network management systems) and network infrastructure devices (e.g., network switch, hub, router, etc.)

To produce a report, multiple queries may be run against events that are persisted in a data store. As used herein, an event is a message, log file entry, correlation event, audit event, etc. Events are further described in U.S. application Ser. No. 11/966,078, filed Dec. 28, 2007, which is incorporated by reference herein in its entirety. Since the event data is quite large, often times in terabytes, the amount of processing involved imposes a significant load on the security system Moreover, where multiple reports are sought at the same time (e.g., monthly, quarterly, etc.), the load on the security system is multiplied, which may cause delays in generating the reports. For example, the processing of events for a monthly report may begin at the end of the month, if multiple monthly reports are requested, the security system may experience a spike in the load at the end of the month.

Load on the security system is also caused, in part, by individually and separately executing each query on the events. In other words, the same event is read from disk many times to compute a result for each individual query. This type of read-many and evaluate-many model is inefficient.

Trends enable customers to track various security-related activities. A trend executes a specified query on a defined schedule and time duration to calculate aggregated results over the specified time duration. The trend maintains aggregate data in a data store. For example, each trend maintains the aggregate data in its own database table in the data store. Each trend issues a single query and saves an aggregation of the query results in the associated trend table. Moreover, each trend is associated with a frequency and duration or time interval during which the query is applied on the events. A security system may be preconfigured with multiple trends. Trends may also be user-configurable.

Trends may be used to generate reports. For example, an hourly trend (i.e., with a duration of one hour) measures the number of bytes of data received at a networked device. The trend results may be persisted in a table of a database, and each record in the trend table represents the count of bytes for an hour in the day. If the user issues a query to the security system expressing interest in the data from 9:00 am-12:00 pm for the last month, records in the table corresponding to those hours for each day in the month may be used to provide the report.

As described herein, a trend is computed in-memory by applying an associated query on an event as it is streamed to a trend processing module in a network security system. The query results are aggregated in-memory and periodically persisted to a data store. The aggregated trend results amortize over a longer duration of time the cost of running a report. In other words, the aggregated trend results represent a pre-processing of the events.

When it comes time to provide a monthly report, for example, at the end of the month, the amount of further processing is reduced since some of the data has already been pre-computed. Furthermore, since the computation of the aggregated trend result occurs in-memory, the amount of disk access is reduced, thereby reducing the load on the security system.

Moreover, a query associated with a trend may be optimized, to identify unique elements of the query. By running those unique elements on the events, the same conditions and/or computed fields of multiple queries (or even of the same query) are computed just once on an event. In other words, conditions or computed fields are not re-computed for the same event, which reduces the number of computations and, load on the network security system.

Systems and methods for in-memory processing of events are provided. A set of unique elements of a plurality of queries is determined. Each query is executed on a defined schedule and time duration. A plurality of events in an event stream is received. The events are filtered using the set of unique elements. For each query, a query result for each filtered event is determined. For each query, in-memory aggregation of the query result of each filtered event is provided.

Figure 1:
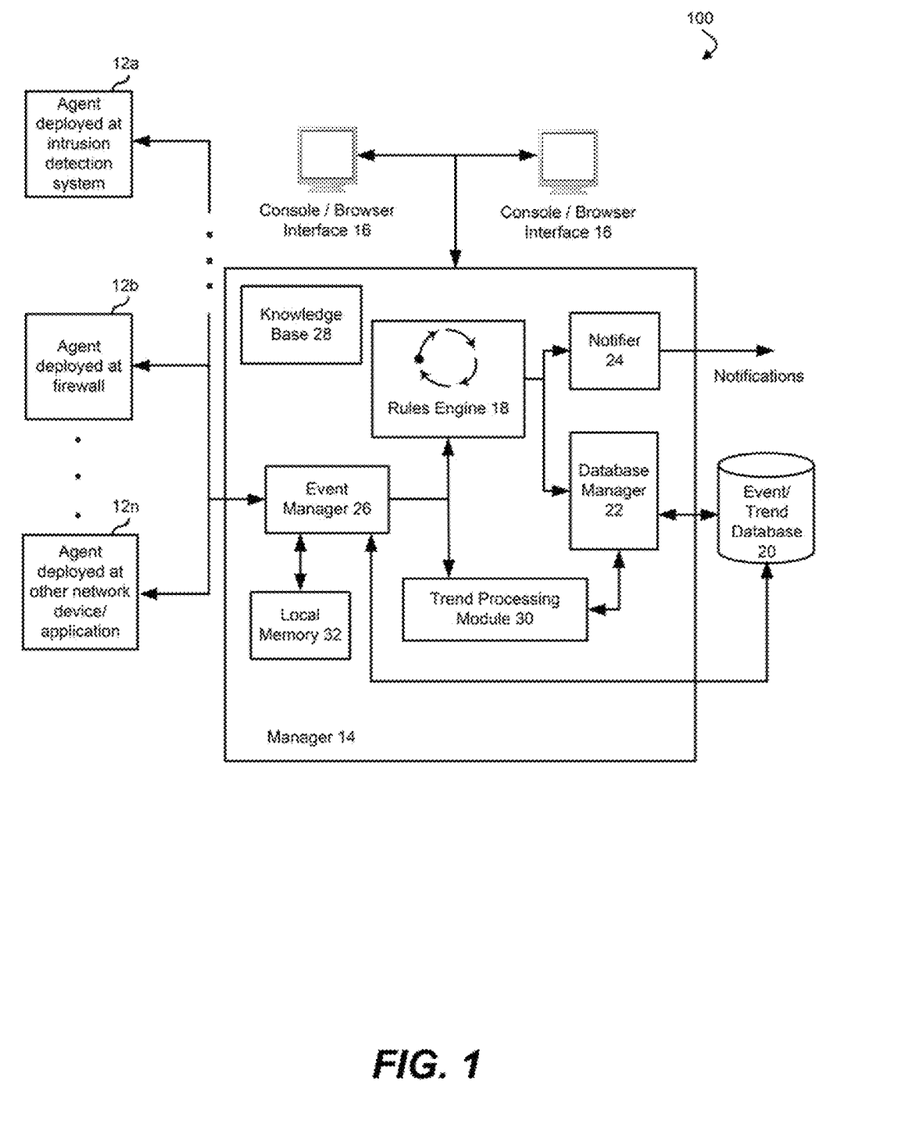
FIG. 1 is a topological block diagram of network security system in accordance with an embodiment.

FIG. 1 is a topological block diagram of a network security system 100 in accordance with an embodiment. System 100 includes agents 12a-n, at least one manager 14 and at least one console 16 (which may include browser-based versions thereof). In some embodiments, agents, managers and/or consoles may be combined in a single platform or distributed in two, three or more platforms (such as in the illustrated example). The use of this multi-tier architecture supports scalability as a computer network or system grows.

Agents 12a-n are software programs that provide efficient, real-time (or near real-time) local event data capture and filtering from a variety of network security devices and/or applications The typical sources of security events are common network security devices, such as firewalls, intrusion detection systems and operating system logs. Agents 12a-n can collect events from any source that produces event logs or messages and can operate at the native device, at consolidation points within the network, and/or through simple network management protocol (SNMP) traps.

Agents 12a-n are configurable through both manual and automated processes and via associated configuration files. Each agent 12 may include at least one software module including a normalizing component, a time correction component, an aggregation component, a batching component, a resolver component, a transport component, and/or additional components. These components may be activated and/or deactivated through appropriate commands in the configuration file.

Manager 14 may be comprised of server-based components that further consolidate, filter and cross-correlate events received from the agents, employing a rules engine 18 and a centralized event and trend database 20. One role of manager 14 is to capture and store all of the real-time and historic event data to construct (via database manager 22) a complete, enterprise-wide picture of security activity. The manager 14 also provides centralized administration, notification (through at least one notifier 24), and reporting, as well as a knowledge base 28 and case management workflow. The manager 14 may be deployed on any computer hardware platform and one embodiment utilizes a database management system to implement the event data store component. Communications between manager 14 and agents 12a-n may be bi-directional (e.g., to allow manager 14 to transmit commands to the platform hosting agents 12a-n) and encrypted. In some installations, managers 14 may act as concentrators for multiple agents 12a-n and can forward information to other managers (e.g., deployed at a corporate headquarters).

Manager 14 also includes at least one event manager 26, which is responsible for receiving the event data messages transmitted by agents 12a-n. Event manager 26 is also responsible for generating event data messages such as correlation events and audit events. Where bi-directional communication with agents 12a-n is implemented, event manager 26 may be used to transmit messages to agents 12a-n. If encryption is employed for agent-manager communications, event manager 26 is responsible for decrypting the messages received from agents 12a-n and encrypting any messages transmitted to agents 12a-n.

Consoles 16 are computer- (e.g., workstation-) based applications that allow security professionals to perform day-to-day administrative and operation tasks such as event monitoring, rules authoring, incident investigation and reporting. Access control lists allow multiple security professionals to use the same system and event/trend database, with each having their own views, correlation rules, alerts, reports and knowledge base appropriate to their responsibilities. A single manager 14 can support multiple consoles 16.

In some embodiments, a browser-based version of the console 16 may be used to provide access to security events, knowledge base articles, reports, notifications and cases. That is, the manager 14 may include a web server component accessible via a web browser hosted on a personal or handheld computer (which takes the place of console 16) to provide some or all of the functionality of a console 16. Browser access is particularly useful for security professionals that are away from the consoles 16 and for part-time users. Communication between consoles 16 and manager 14 is bi-directional and may be encrypted.

Through the above-described architecture, a centralized or decentralized environment may be supported. This is useful because an organization may want to implement a single instance of system 100 and use an access control list to partition users. Alternatively, the organization may choose to deploy separate systems 100 for each of a number of groups and consolidate the results at a "master" level. Such a deployment can also achieve a "follow-the-sun" arrangement where geographically dispersed peer groups collaborate with each other bypassing oversight responsibility to the group currently working standard business hours. Systems 100 can also be deployed in a corporate hierarchy where business divisions work separately and support a roll-up to a centralized management function.

The network security system 100 also includes trend processing capabilities. In one embodiment, manager 14 further includes a trend processing module 30 and a local memory 32. Trend processing module 30 is configured to receive a set of events, such as security events from at least one of agents 12a-n via event manager 26, from event and trend database 20 via the database manager 22, or from event manager 26. The set of events may be read into local memory 32. Local memory 32 may be any appropriate storage medium and may be located on manager 14 itself, in a cluster containing manager 14, or on a network node accessible to manager 14. Trend processing module 30 is further configured to process the events in-memory (e.g., in local memory 32) by applying a filter associated with a trend on each event, and aggregating the trend results. Trend processing module 30 is also configured to store the aggregated trend results in a persistent store, such as a trend table of database 20 via database manager 22.

As previously described, a trend is a task scheduled to periodically run a query, the aggregated results of which are periodically stored, for example in a database table associated with that particular trend. Trends may be employed for providing reports to a network administrator or other analyst using the network security system 100. Where multiple trends are scheduled, trend processing module 30 is configured to determine the queries for each trend and the conditions and computed fields of each query. Furthermore, trend processing module 30 is configured to filter the events according to the conditions and computed fields. The query results are aggregated and periodically stored in event and trend database 20.

Trend processing module 30 may optimize the filtering process by applying unique conditions and unique computed fields to each received event. For example, there may be 60 trends that are evaluated. Each trend may include 10 conditions. In total, this amounts to 600 conditions. The 600 conditions may be comprised of 100 unique conditions. Instead of performing 600 evaluations of conditions to the event, the 100 unique conditions are applied, thereby reducing the number of computations.

In one embodiment, agents 12a-n may be further configured to process events in-memory. In particular, agents 12a-n are configured to receive a set of events from a source, process the events in-memory by applying a filter associated with a trend on each event, and aggregate the trend results. An agent operates on events which it receives and does not have information on the events received by other agents. As such, the aggregated data provided by an agent is a trend result that is based on a partial set of events (e.g., partially aggregated trend result).

In operation, agents 12a-n may provide events and/or aggregated data. In one example, agents 12a-n provide events, which are received in an event stream by event manager 26 and passed to rules engine 18 and trend processing module 30 for processing. Furthermore, events generated by manager 14 via event manager 26 are also passed to rules engine 18 and trend processing module 30 for processing. As used herein, an event stream is a continuous flow of events. Event data received from agents 12a-n or generated by manager 14 are stored in an event table of database 20 via database manager 22.

Upon receiving an event, trend processing module 30 filters the event according to the conditions and computed fields. The conditions applied may be the unique conditions of the set of query conditions. Likewise, the computed fields applied may be the unique computed fields. For an event that passes the filter, each query is evaluated on that event. The result of each query is held in memory of manager 14. The query results are aggregated for multiple events as an aggregated trend result, which is stored in a trend table of database 20. In one embodiment, each trend is associated with its own table in database 20.

When it comes time to provide a report, the trend tables of database 20 are queried and the relevant pre-computed data (i.e., aggregated trend results) are retrieved. As such, a read-once and evaluate-many model is described herein. The load on the system is significantly reduced by reducing the amount of disk access and by evaluating unique conditions and unique computed fields.

Figure 2A:
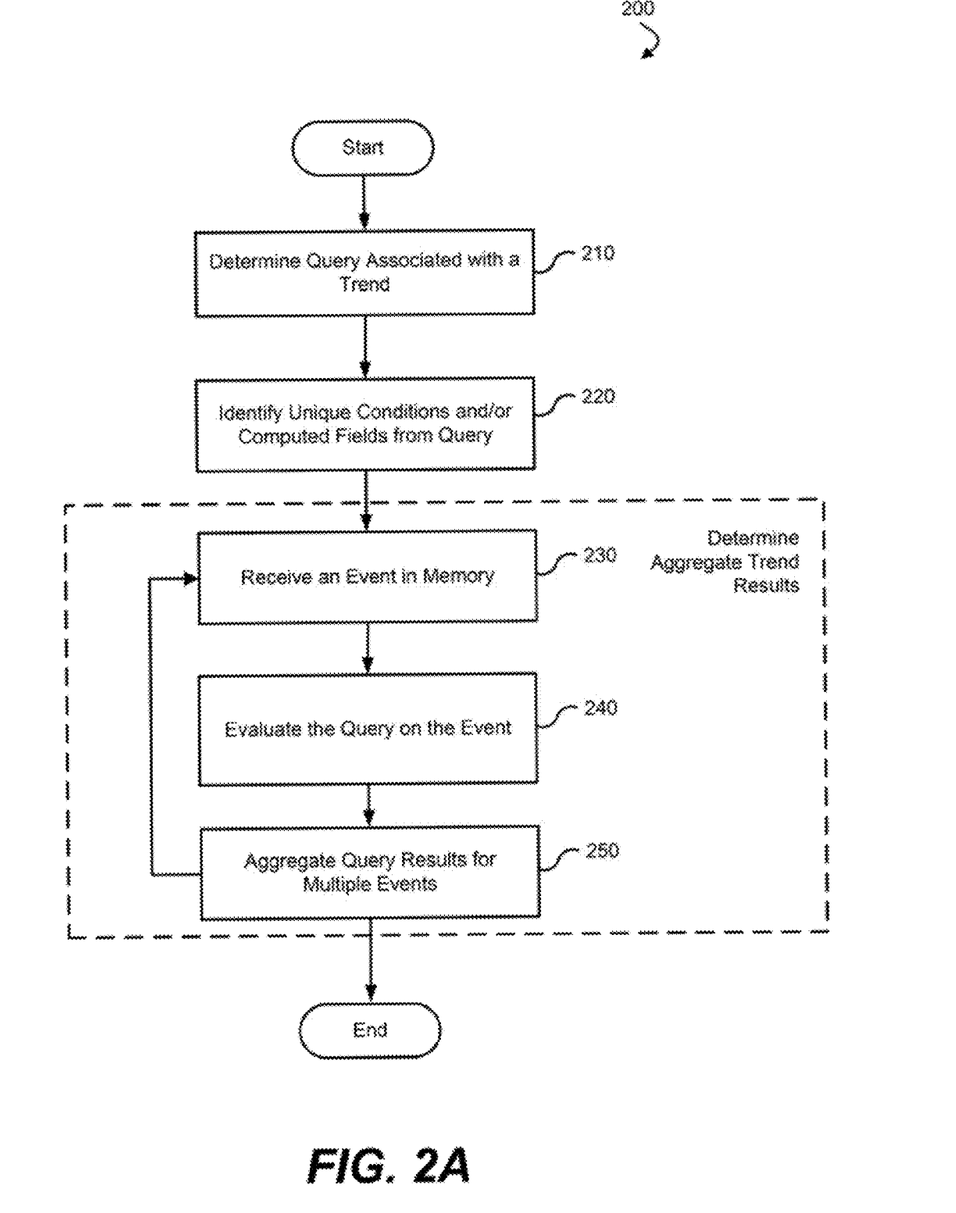
FIG. 2A is a process flow diagram for in-memory generation of aggregated trend results in accordance with an embodiment.

FIG. 2A is a process flow diagram for n-memory generation of aggregated trend results in accordance with an embodiment. The depicted process flow 200 may be carried out by execution of sequences of executable instructions. In another embodiment, various portions of the process flow 200 are carried out by components of a network security system, an arrangement of hardware logic, e.g., an Application-Specific Integrated Circuit (ASIC). etc. For example, blocks of process flow 200 may be performed by execution of sequences of executable instructions in a trend processing module of the network security system. The trend processing module may be deployed, for example, at a manager and/or an agent in the network security system.

Trend reporting capabilities enable customers to track activity over a specified period of time to identify, for example, changes in risks or threats in the networked devices. The performance for generating regularly-scheduled reports is improved, in part, by evaluating the events as they arrive in memory. At step 210, a query associated with a trend is determined. Where multiple trends are evaluated by the network security system, each query associated therewith is determined.

At step 220, unique elements (e.g., unique conditions and unique computed fields) are identified from the query. As used herein, an element of a query is an elemental expression of the query. In general, queries are comprised of conditions or expressions, for example in WHERE clauses and in HAVING clauses to SELECT subsets of data. Many conditions compare values, for example, for equality, inequality, or similarity.

Even though queries are unique (e.g., looking for different events and computing different results), there may be commonalities in the conditions that are used. The unique conditions in a single query are identified. Where there are multiple queries, the unique conditions among the queries are identified.

Conditions may have composite filters, for example, a filter may have sub-filters. As used herein, a condition element is an elemental expression of a condition or sub-condition. As such unique condition elements may be identified.

Furthermore, unique computed fields are also identified. As used herein, a computed field is a field, for example in a database table, for which the values are a result of a calculation performed on at least one other field. In one embodiment, the calculation involves applying a function or expression attribute on another field or by joining tables. Where multiple queries are determined, the unique computed fields among all queries are identified. Typically, evaluation of a computed field is quite complex, involving various other fields and/or tables.

The filter results that are determined using the unique conditions and unique computed fields can be shared among all queries, thereby reducing the redundancy of evaluations performed on the events. For example, a first query may include a condition: SELECT*from T WHERE source=001.16.254.1. Another query, while being different from the first query, shares this same condition. Instead of evaluating this condition twice on the received event (i.e., once for the first query, and again for the second query), the condition is evaluated once on the received event (e.g., as a filter), and the result is shared between the first and second queries.

In another example, the first query may include a computed field which specifies a role of an actor: SELECT*from T WHERE role(Source_IP_Address)=developer. The second query may include the identical computed field but in the context of a different query: SELECT*from T WHERE role (Source_IP_Address)=QA. The "role" computed field is complex. If these queries were computed on events on disk (or even in-memory), the same computed field may be evaluated multiple times. Since evaluation of computed fields is a resource intensive operation, it is beneficial to reduce the redundancy with these evaluations. Specifically, the computed field that is common to both of the queries may be evaluated once and the filter result shared among all queries under evaluation in the network security system.

Sharing the results using unique conditions and unique computed fields provides efficiencies for both in-memory evaluations and evaluations of queries against data stored on disk, for example in an event table of a database.

As events are received and the queries are evaluated on the events, aggregate trend results are determined. At step 230, an event is received in memory, for example by a manager in a network security system. The event may have originated from an agent and is received by the manager via an event stream. In another embodiment, the event is received by an agent from a source device, such as a networked device.

At step 240, the query is evaluated on the event. Evaluation includes filtering and determining a query result. To filter, the unique conditions and/or unique computed fields from the query, or among the multiple queries, are applied to the event. The filter conditions and computed fields are used to determine whether the events are of interest. The events that do not pass the filter are not processed any further.

In one embodiment, filter trees are used to apply the unique conditions and/or unique computed fields on the event(s). Specifically, a filter tree is generated for each query. A filter tree represents conditions and/or computed fields of a single query. Where there are multiple queries, the filter trees of each query are combined, forming a complex expression which is then applied on the event(s).

In another embodiment, the conditions and/or computed fields, are applied to the event(s) as a logical OR of each condition and/or computed field. Other techniques for filtering events using the unique conditions and/or computed fields may be implemented.

A query result is determined for those events that pass the filter. This result is the outcome of applying the query on the event. For example, where the query includes a GROUP BY clause, HAVING clause, ORDER clause, or other non-conditional clause, the complete query including these and other non-conditional clauses is executed on the filtered event.

At step 250, the query result for multiple events are aggregated. As used herein an aggregated result is the query result over all filtered events for the duration of the trend interval. The same query is evaluated on multiple events, and the result of each evaluation is aggregated, providing a single combined result (i.e., aggregated trend result).

For example, a result for a query that was evaluated on a first event is determined. A result for the same query that is evaluated on a second event is determined. The result of the query for the first event is aggregated with the result of the query for the second event, providing an aggregated trend result, In another example, an hourly trend may measure the bandwidth usage by a source IP address over the span of one hour. In one embodiment, one event includes a measurement of bandwidth usage by the source IP address. Another event includes its own measurement of bandwidth usage by the same source IP address. To determine an aggregate trend result (e.g., total running count), the bandwidth usage of both events is aggregated by summation.

Processing continues from step 250 to step 230, where another event is processed in-memory. The event processing continues, for example, until end time interval has expired as described in FIG. 2B.

The aggregated trend results may not be used directly. As previously described, reports or queries may be applied on the trend results to generate a final report. For example, a report may be interested in understanding the total number of attacks to a networked device in the security system over the course of a month. The trend may pre-calculate the event data at higher frequencies, i.e., generating an aggregated trend result on a daily basis rather than evaluating all events at once at the end of the month. When the report is due at the end of the month, the 30 aggregated trend results (one for each day) are used to generate the final report. By evaluating the events on a daily basis, the cost of executing the queries is distributed over multiple days. Computationally, the evaluation of the smaller set of event data in-memory significantly reduces the load on the security system. When the final report is due at the end of the month, the majority of the data is already pre-calculated and the final report may be generated quickly and on time.

Furthermore, disk access is greatly reduced, which may provide additional efficiencies. Since the query evaluation occurs entirely in-memory, disk access may be limited to collecting, for example from a trend table in the database, the aggregated trend results that are relevant for the report.

Figure 2B:
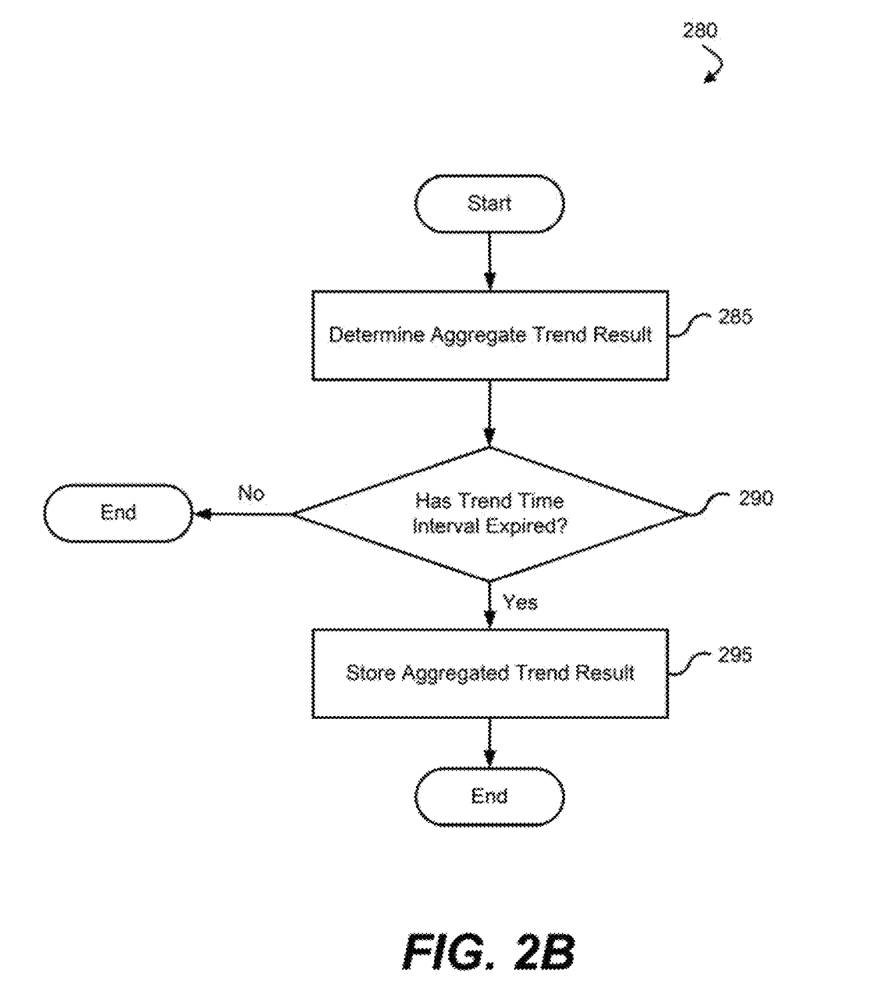
FIG. 2B is a process flow diagram for persisting aggregated trend results in accordance with an embodiment.

FIG. 2B is a process flow diagram for persisting aggregated trend results n accordance with an embodiment. The depicted process flow 280 may be carried out by execution of sequences of executable instructions. In another embodiment, various portions of the process flow 280 are carried out by components of a network security system, an arrangement of hardware logic, e.g., an Application-Specific Integrated Circuit (ASIC), etc. For example, blocks of process flow 280 may be performed by execution of sequences of executable instructions in a trend processing module of the network security system. The trend processing module may be deployed, for example, at a manager in the network security system.

At step 285, an aggregated trend result is determined. For example, as described in FIG. 2A. The aggregated trend result may be sent by an agent and received by the trend processing module deployed at the manager. In another embodiment, the aggregated trend result is generated by the trend processing module deployed at the manager.

Events are processed until a trend time interval has expired. At step 290, it is determined whether the trend time interval has expired. As previously mentioned, each trend is associated with a duration or time interval during which the query is evaluated on the events. If the interval has expired for the trend, the aggregated trend results are persisted or otherwise stored at step 295, for example in a trend table of a database.

In one embodiment, the aggregated trend results are persisted after the expiration of the interval and after a grace period. The grace period allows some events that are in the processing pipeline to be taken into account in the aggregate result.

A data checkpoint may be generated at a defined interval (e.g., every 5 minutes or 10 minutes). At any time during the course of process flow 200 or 280, when a checkpoint time interval has elapsed, the current running value of the aggregated trend result(s) in memory is persisted, for example as a serialized data structure in a file on a file system. The checkpoint interval may be configurable. In one embodiment, if a system shutdown is requested at any time during the course of process flow 200 or 280, the aggregated trend result checkpoint is persisted to disk.

Figure 3:
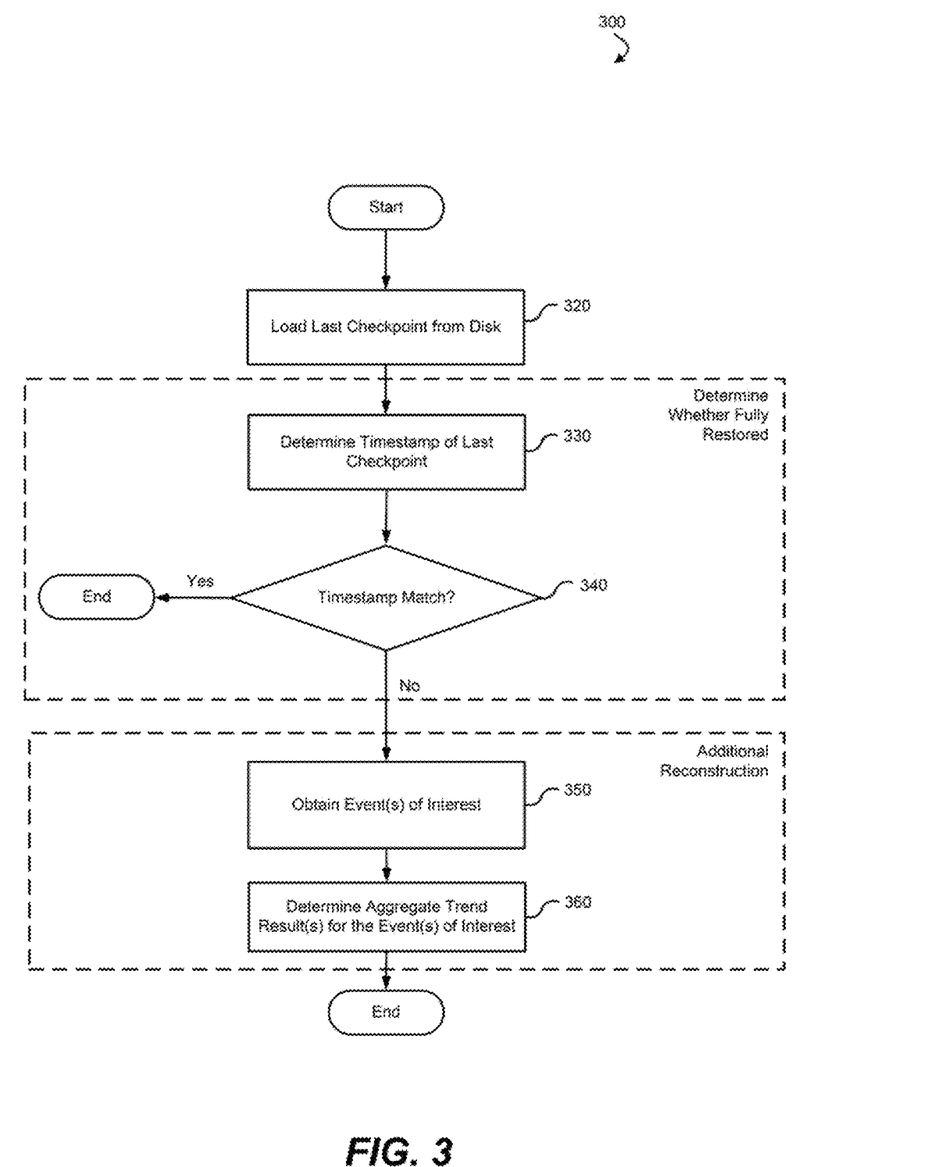
FIG. 3 is a process flow diagram for restoring system state in accordance with an embodiment.

FIG. 3 is a process flow diagram for restoring system state in accordance with an embodiment. The depicted process flow 300 may be carried out by execution of sequences of executable instructions. In another embodiment, various portions of the process flow 300 are carried out by components of a network security system, an arrangement of hardware logic, e.g., an Application-Specific Integrated Circuit (ASIC), etc. For example, blocks of process flow 300 may be performed by execution of sequences of executable instructions in a trend processing module of the network security system. The trend processing module may be deployed, for example, at a manager in the network security system.

In the case of a system failure or other scenario where the system is unintentionally shutdown, the manager may be restored to a previous state. Specifically, the manager may be restored to a state when the shutdown occurred. The previous state of the manager may be restored before any new events in an event stream are evaluated by the manager. Recovery begins at the time of startup of the manager, after the system failure. At step 320, a last checkpoint (e.g., most recent checkpoint) is loaded from disk. More specifically, the state of the trend processor is restored to the time when the last checkpoint was taken, by loading the last checkpoint from a file system to the manager memory.

It is determined whether the manager is fully restored to the previous state. If so, the manager may resume from the last checkpoint. Otherwise, additional reconstruction of previous state is performed. At step 330, a timestamp of the last checkpoint is determined. A manager shutdown timestamp and the timestamp of the last checkpoint are compared, and it is determined whether there is a match between the two, at step 340. If the timestamps match, it is determined that the manager is fully restored to the previous state (i.e., the state of the manager when the shutdown occurred). The manager is deemed to be ready to resume processing of new events in memory.

If there is no match, additional reconstruction is performed in order to restore the manager to the previous state (i.e., the state of the manager when the shutdown occurred). At step 350, event(s) of interest are obtained, for example, from an event database which includes real-time and historic event data. Events of interest include events that arrived at the trend processor after the last checkpoint was taken and before the manager shutdown occurred.

For example, a checkpoint occurred at 11:00 and the manager abruptly shutdown at 11:02. The aggregated trend result(s) through 11:00 may be obtained from the last checkpoint. However, there is a period of two minutes (time between the last checkpoint timestamp and the shutdown) where processed events were in memory, but were not reflected in the last checkpoint. These events of interest are retrieved. As such, loading the last checkpoint provides a partial restore to the previous state.

The events of interest are reprocessed to fully restore the state to the time when the manager went down. Specifically, at step 360, an aggregate trend result is determined for the events of interest. The events of interest are evaluated, for example, as described in FIG. 2. In particular, the queries are evaluated on each of the events of interest and the query results are aggregated. The aggregated trend result represents a snapshot of the memory for the time period when the shutdown occurred. At this stage, the previous state (i.e., the state of the manager when the shutdown occurred) is fully restored and the manager is ready to resume processing of new events in memory.

Figure 4A:
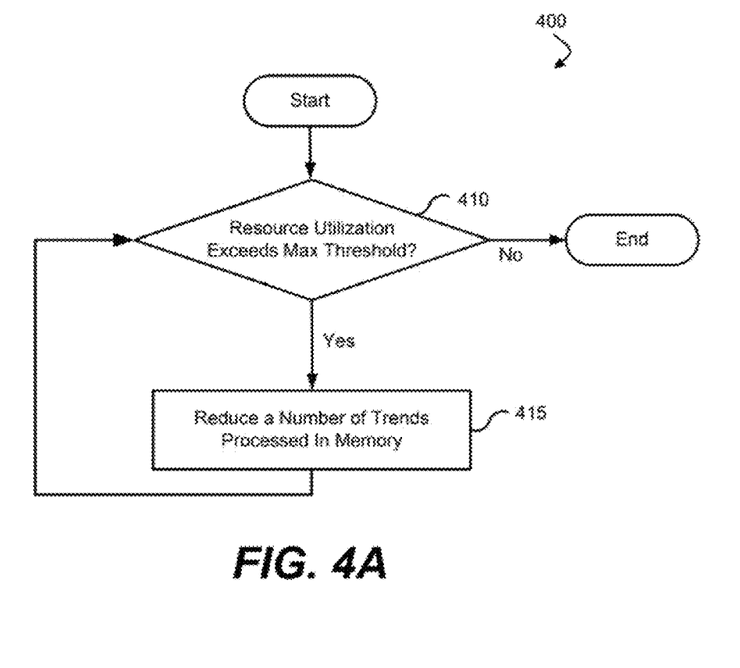
FIG. 4A is a process flow diagram for load-sharing in accordance with an embodiment.

FIG. 4A is a process flow diagram for load-sharing in accordance with an embodiment. The depicted process flow 400 may be carried out by execution of sequences of executable instructions. In another embodiment, various portions of the process flow 400 are carried out by components of a network security system, an arrangement of hardware logic, e.g., an Application-Specific Integrated Circuit (ASIC), etc. For example, blocks of process flow 400 may be performed by execution of sequences of executable instructions in a trend processing module of the network security system. The trend processing module may be deployed, for example, at a manager in the network security system.

The responsibility of processing events may be selectively shifted from real-time, in-memory processing to batch processing in a data store, both of which produce the same result, i.e., an aggregated trend result.

At step 410, it is determined whether utilization of a resource exceeds a maximum threshold. For example, a system administration component of the manager may monitor the processor load and/or memory consumption based on in-memory evaluation of the events, and may generate an alert or other message where a maximum processor load threshold or maximum memory consumption threshold is exceeded. In one embodiment, the alert is generated if at least one of the maximum thresholds is exceeded for an extended duration, for example to avoid processor spikes.

Where the maximum threshold is exceeded, the number of trends that are processed in memory are reduced, at step 415. For example, if the system is low on memory or processor resources, a subset of the in-memory queries are temporarily suspended for in-memory evaluation. The suspended queries are evaluated at a later time against the same events that are streamed in-memory, but using batch processing in an event database which includes real-time and historic event data.

Furthermore, trends (and associated queries) may be selected to be suspended based on various resource utilization statistics. For example, a query that consumes high amounts of memory or processor resources is selected to be suspended and offloaded to batch processing in a data store.

Figure 4B:
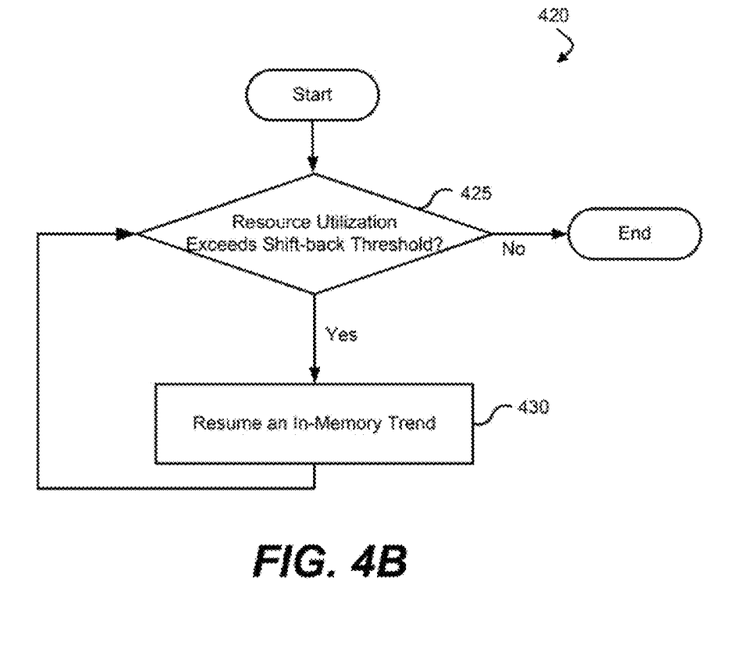
FIG. 4B is another process flow for load-sharing in accordance with an embodiment.

FIG. 4B is another process flow for load-sharing in accordance with an embodiment. The depicted process flow 420 may be carried out by execution of sequences of executable instructions. In another embodiment, various portions of the process flow 420 are carried out by components of a network security system, an arrangement of hardware logic, e.g., an Application-Specific Integrated Circuit (ASIC), etc. For example, blocks of process flow 420 may be performed by execution of sequences of executable instructions in a trend processing module of the network security system. The trend processing module may be deployed, for example, at a manager in the network security system.

The responsibility of processing events may be selectively shifted from batch processing in a data store back to real-time, in-memory processing.

At step 425, it is determined whether utilization of a resource of the manager exceeds a shift-back threshold. The shift-back threshold represents the minimum amount of resource availability that is needed to resume in-memory processing of suspended trends (and associated queries). Where the minimum amount of resource becomes available, one or more suspended trends may be selected to resume in-memory processing, at step 430.

Figure 4C:
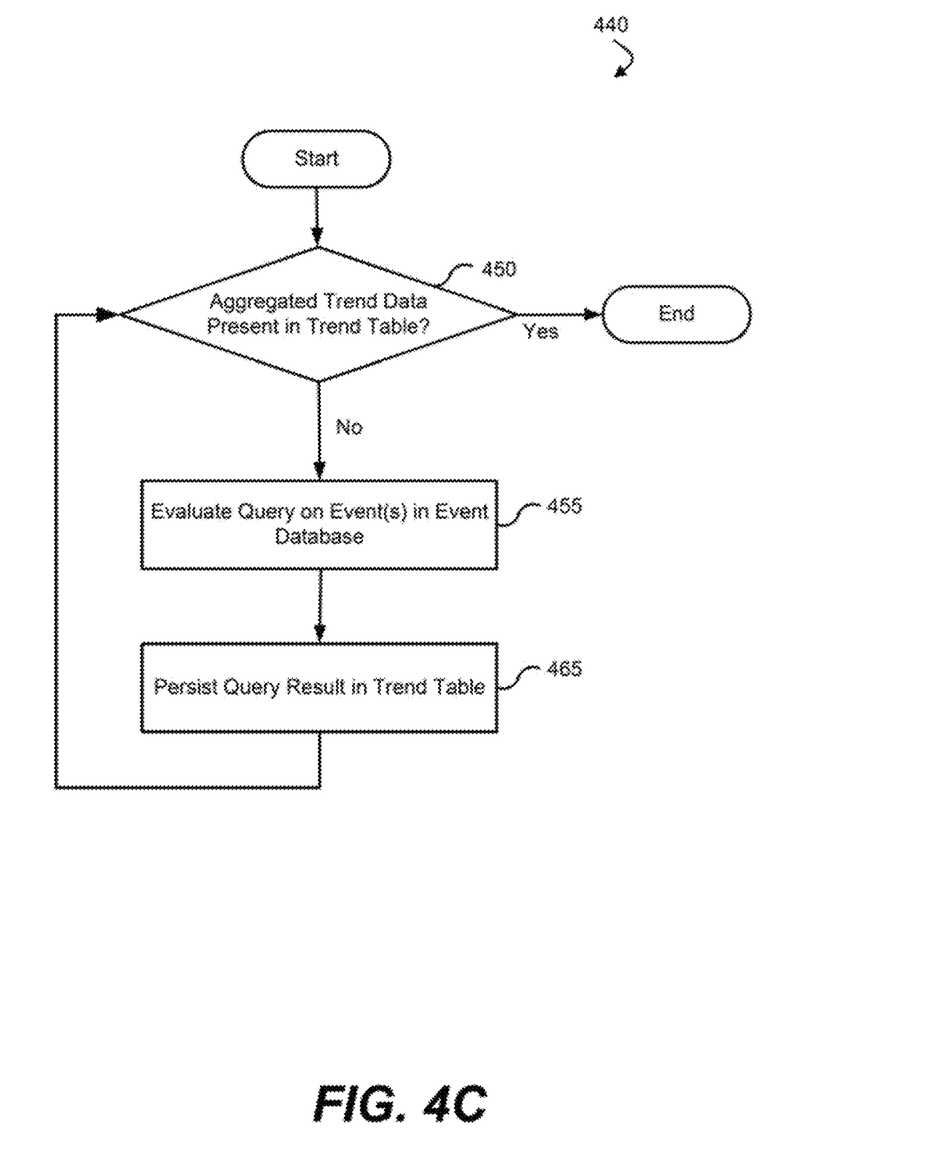
FIG. 4C is a process flow diagram for monitoring trend data in accordance with an embodiment.

FIG. 4C is a process flow diagram for monitoring trend data in accordance with an embodiment. The depicted process flow 440 may be carried out by execution of sequences of executable instructions. In another embodiment, various portions of the process flow 440 are carried out by components of a network security system, an arrangement of hardware logic, e.g., an Application-Specific Integrated Circuit (ASIC), etc. For example, blocks of process flow 440 may be performed by execution of sequences of executable instructions in a trend data monitor of the network security system. The trend data monitor may be deployed, for example, at a manager in the network security system.

A periodic task may be executed to monitor the trend table in the database. At step 450, it is determined whether the aggregated data for a trend is present in the trend table as expected. The aggregated trend data is expected to be persisted, for example, when the trend time interval has expired. The periodic task checks to confirm that the data has indeed been persisted as expected.

Where the aggregated trend data is not found in the trend table, the query associated with the trend is evaluated on an event database, at step 455. In other words, the query is evaluated on the events as a batch process. At step 465, a query result is persisted, for example, by populating the trend table. As such, the trend is evaluated against the events stored in the database when the in-memory processing is not behaving as expected.

Figure 5:
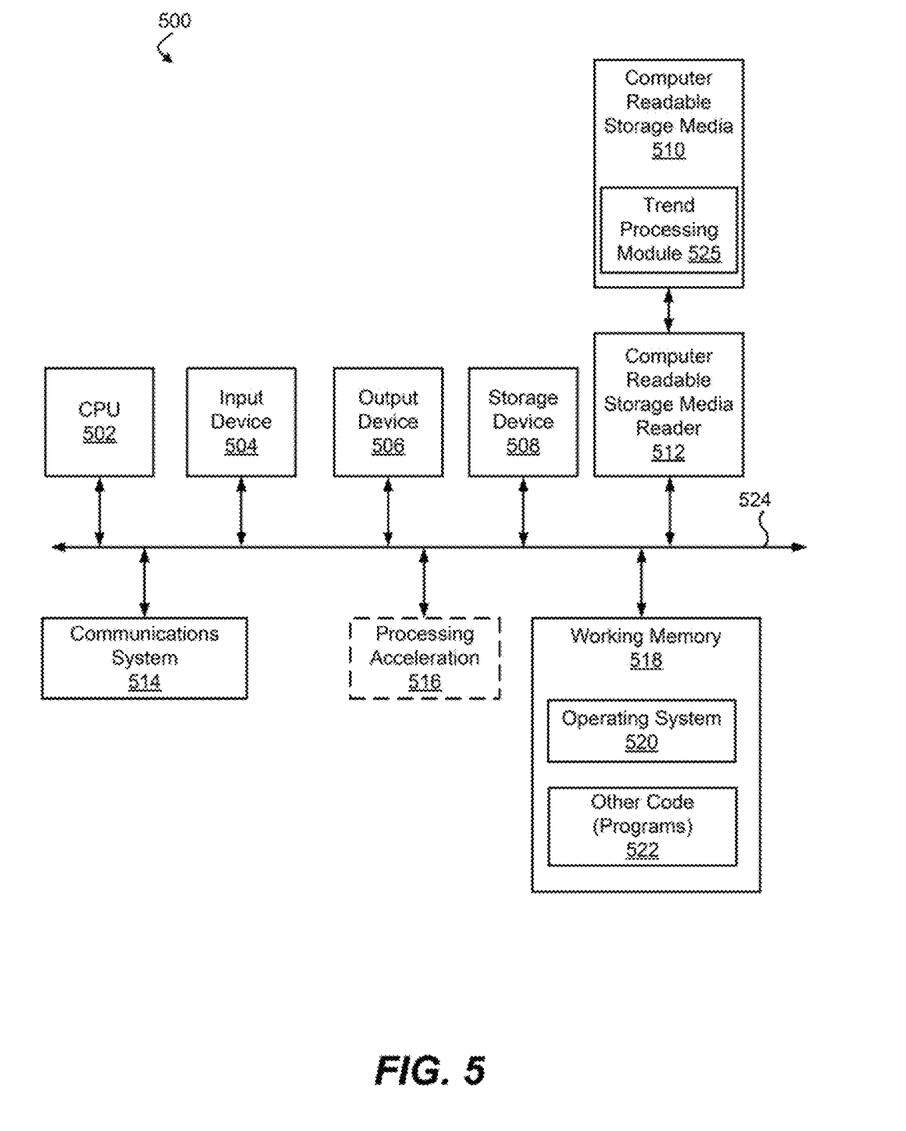
FIG. 5 illustrates a computer system in which an embodiment may be implemented.

FIG. 5 illustrates a computer system in which an embodiment may be implemented. The system 500 may be used to implement any of the computer systems described above. The computer system 500 is shown comprising hardware elements that may be electrically coupled via a bus 524. The hardware elements may include at least one central processing unit (CPU) 502, at least one input device 504, and at least one output device 506. The computer system 500 may also include at least one storage device 508. By way of example, the storage device 508 can include devices such as disk drives, optical storage devices, solid-state storage device such as a random access memory ("RAM") and/or a read-only memory ("ROM"), which can be programmable, flash-updateable and/or the like.

The computer system 500 may additionally include a computer-readable storage media reader 512, a communications system 514 (e.g., a modem, a network card (wireless or wired), an infra-red communication device, etc.), and working memory 518, which may include RAM and ROM devices as described above. In some embodiments, the computer system 500 may also include a processing acceleration unit 516, which can include a digital signal processor (DSP), a special-purpose processor, and/or the like.

The computer-readable storage media reader 512 can further be connected to a computer-readable storage medium 510, together (and in combination with storage device 508 in one embodiment) comprehensively representing remote, local, fixed, and/or removable storage devices plus any tangible non-transitory storage media, for temporarily and/or more permanently containing, storing, transmitting, and retrieving computer-readable information (e.g., instructions and data). Computer-readable storage medium 510 may be non-transitory such as hardware storage devices (e.g., RAM, ROM, EPROM (erasable programmable ROM), EEPROM (electrically erasable programmable ROM), hard drives, and flash memory). The communications system 514 may permit data to be exchanged with the network and/or any other computer described above with respect to the system 500. Computer-readable storage medium 510 includes a trend processing module 525, and may also include a trend data monitor.

The computer system 500 may also comprise software elements, which are machine readable instructions, shown as being currently located within a working memory 518, including an operating system 520 and/or other code 522, such as an application program (which may be a client application, Web browser, mid-tier application, etc.). It should be appreciated that alternate embodiments of a computer system 500 may have numerous variations from that described above. For example, customized hardware might also be used and/or particular elements might be implemented in hardware, software (including portable software, such as applets), or both. Further, connection to other computing devices such as network input/output devices may be employed.

The specification and drawings are, accordingly, to be regarded in an illustrative rather than a restrictive sense. It will, however, be evident that various modifications and changes may be made.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example of a generic series of equivalent or similar features.

What is claimed is:

1. A method implemented by a physical processor executing machine readable instructions for in-memory processing of events, the method comprising:
    determining a set of unique elements of a plurality of queries, wherein each query of the plurality of queries is executed on a defined schedule and a tune duration;
    receiving, at a local memory of a computing device, a plurality of events in an event stream;
    filtering the plurality of events using the set of unique elements:
    for each query of the plurality of queries, determining a query result for each filtered event of the plurality of events; and
    for each query of the plurality of queries, providing in-memory aggregation of the query result of each filtered event.

2. The method of claim 1, wherein the set of unique elements includes a unique computed field.

3. The method of claim 1, wherein determining the set of unique elements comprises:
    determining a computed field of a first query of the plurality of queries and a computed field of a second query of the plurality of queries are identical.

4. The method of claim 1, further comprising:
    for each query of the plurality of queries, storing an aggregated query result in a persistent storage.

5. The method of claim 1, wherein determining the set of unique elements comprises:
    determining a filter tree for a first query of the plurality of queries, wherein the filter tree for the first query includes a set of unique elements of the first query;
    determining a filter tree for a second query of the plurality of queries, wherein the filter tree for the second query includes a set of unique elements of the second query; and
    combining the filter tree for the first query with the filter tree of the second query.

6. The method of claim 1, further comprising:
    generating a plurality of data checkpoints, wherein each checkpoint includes an in-memory running value of an aggregated query result;
    detecting a shut-down of the computing device; and
    restoring the computing device to a previous state using a data checkpoint of the plurality of checkpoints.

7. The method of claim 6, wherein restoring the computing device further comprises:
    loading the data checkpoint of the plurality of checkpoints to the local memory of the computing device; and
    determining whether the computing device is fully restored to the previous state.

8. The method of claim 7, further comprising:
    obtaining events of interest from a persistent storage where it is determined the computing device is not fully restored;
    filtering the events of interest using the set of unique elements;
    for each query of the plurality of queries, determining a query result for each filtered event of interest; and
    for each query of the plurality of queries, providing in-memory aggregation of the query result of each filtered event of interest.

9. A system for processing events, the system comprising:
    a persistent store for storage of aggregated query results; and
    a computer that includes:
        a memory for in-memory aggregation of query results; and
        a physical processor that implements machine readable instructions that cause the computer to:
            determine a set of unique elements of a plurality of queries, wherein each query of the plurality of queries is executed on a defined schedule and a time duration;
            receive a plurality of events in an event stream;

filter the plurality of events using the set of unique elements;

for each query of the plurality of queries, determine a query result for each filtered event of the plurality of events; and for each query of the plurality of queries, provide in-memory aggregation of the query result of each filtered event.

10. The system of claim 9, wherein the persistent store includes the plurality of events, and wherein the physical processor implements machine readable instructions to cause the computer to:

select a query of the plurality of queries; and execute the selected query on the plurality of events in the persistent store.

11. The system of claim 9, wherein determining the set of unique elements comprises:

determining a computed field of a first query of the plurality of queries and a computed field of a second query of the plurality of queries are identical.

12. The system of claim 9, wherein for each query of the plurality of queries, an aggregated query result is stored in the persistent store.

13. A non-transitory computer-readable medium storing a plurality of instructions to control a data processor to process events, the plurality of instructions comprising instructions that cause the data processor to:

determine a set of unique elements of a plurality of queries, wherein each query of the plurality of queries is executed on a defined schedule and a time duration;

receive, at a local memory of a computing device, a plurality of events in an event stream;

filter the plurality of events using the set of unique elements;

for each query of the plurality of queries, determine a query result for each filtered event of the plurality of events; and for each query of the plurality of queries, provide in-memory aggregation of the query result of each filtered event.

14. The non-transitory computer-readable medium of claim 13, wherein the set of unique elements includes a unique computed field.

15. The non-transitory computer-readable medium of claim 13, wherein the instructions that cause the data processor to determine the set of unique elements comprise instructions that cause the data processor to determine a computed field of a first query of the plurality of queries and a computed field of a second query of the plurality of queries are identical.

* * * * *